United States Patent
Kovacevic et al.

(10) Patent No.: US 10,243,796 B2
(45) Date of Patent: *Mar. 26, 2019

(54) UICC UPDATE VIA TRUSTED EXECUTION ENVIRONMENT

(71) Applicant: T-Mobile USA, Inc., Bellevue, WA (US)

(72) Inventors: Amela Kovacevic, Sammamish, WA (US); Ryan King, La Verne, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/906,566

(22) Filed: Feb. 27, 2018

(65) Prior Publication Data
US 2018/0191560 A1 Jul. 5, 2018

Related U.S. Application Data

(63) Continuation of application No. 15/393,021, filed on Dec. 28, 2016, now Pat. No. 9,942,094.

(51) Int. Cl.
*H04L 5/00* (2006.01)
*H04W 4/14* (2009.01)
(Continued)

(52) U.S. Cl.
CPC .......... *H04L 41/082* (2013.01); *H04L 5/0055* (2013.01); *H04W 4/14* (2013.01);
(Continued)

(58) Field of Classification Search
CPC .... H04L 41/082; H04L 5/0055; H04W 12/04; H04W 68/005; H04W 12/06; H04W 4/14;
(Continued)

(56) References Cited

U.S. PATENT DOCUMENTS

2013/0344857 A1 12/2013 Berionne et al.
2015/0119017 A1 4/2015 Wu et al.
(Continued)

FOREIGN PATENT DOCUMENTS

EP 2866418 A1 4/2015

OTHER PUBLICATIONS

U.S. Appl. No. 15/393,021—Notice of Allowance dated Dec. 28, 2017, 20 pages.
(Continued)

*Primary Examiner* — Nam T Huynh
(74) *Attorney, Agent, or Firm* — Han Santos, PLLC (57) ABSTRACT

The use of a Trusted Execution Environment (TEE) of a user device to perform Universal Integrated Circuit Card (UICC) update may replace the conventional use of multiple SMS messages to update the UICC of a user device. A UICC update request may be sent to a UICC update service of a wireless communication network via a communication session by a trusted update application that is executing in the TEE. Subsequently, the UICC update service may send a UICC update file to the user device via the communication session for storage in the TEE. A copy of the UICC update file is then transferred from the TEE to modem software of a modem in the user device. The modem software chunks the UICC update files into multiple UICC update data chunks. The data chunks are sent by the modem software to the UICC to update the UICC.

20 Claims, 7 Drawing Sheets

(51) Int. Cl.
*H04L 12/24* (2006.01)
*H04W 12/04* (2009.01)
*H04W 12/06* (2009.01)
*H04W 12/10* (2009.01)
*H04W 68/00* (2009.01)
*H04L 12/931* (2013.01)

(52) U.S. Cl.
CPC ........... *H04W 12/04* (2013.01); *H04W 12/06* (2013.01); *H04W 12/10* (2013.01); *H04W 68/005* (2013.01); *H04L 49/355* (2013.01)

(58) Field of Classification Search
CPC ....... H04W 12/10; H04W 76/02; H04W 8/20; H04W 4/001
See application file for complete search history.

(56) References Cited

U.S. PATENT DOCUMENTS

| | | |
|---|---|---|
| 2015/0242336 A1 | 8/2015 | Loreskär et al. |
| 2016/0142890 A1 | 5/2016 | Drozdovskyy et al. |
| 2016/0157092 A1 | 6/2016 | Uy et al. |
| 2016/0218763 A1 | 7/2016 | Trau et al. |

OTHER PUBLICATIONS

The International Search Report and Written Opinion for PCT Application No. PCT/US2017/067719 dated Apr. 10, 2018, 10 pages.

FIG. 7

UICC UPDATE VIA TRUSTED EXECUTION ENVIRONMENT

CROSS REFERENCE TO RELATED PATENT APPLICATION

This patent application is a continuation application of U.S. patent application Ser. No. 15/393,021, filed on Dec. 28, 2016, entitled "Trusted Execution Environment-based UICC Update," which is hereby incorporated by reference in its entirety.

BACKGROUND

Mobile communication devices may use Universal Integrated Circuit Cards (UICCs), also referred to as subscriber identity modules (SIMs), to authenticate themselves to a wireless carrier network in order to receive communication services from the wireless carrier network. A UICC may be an integrated circuit chip that stores information which uniquely identifies the UICC, as well as information for accessing the wireless carrier network. Such information may include an integrated circuit card identifier (ICCID), an international mobile subscriber identity (IMSI) number, security authentication information, an operator profile that enables the UICC to authenticate with the wireless carrier network, as well as other information. A UICC may also store an applet that may be executed by an onboard processor of the UICC to perform a specific task independently of the data processing capabilities of the mobile communication device.

In some instances, a UICC may need to be updated after the UICC has been installed in a mobile communication device. For example, a wireless carrier network may desire to push a modified operator profile to the UICC. In another example, an applet that is stored in the UICC may become obsolete, so that the wireless carrier network may desire to install a new version of the applet onto the UICC. Remote updates to a UICC may be accomplished using short message service (SMS) messages. During an update, a wireless carrier network may send an update to the UICC that is installed in a mobile communication device via a SMS message, or via a series of SMS messages. However, because each SMS message has a relatively small maximum message size limit, the transfer of large updates to the UICC via multiple SMS message is highly susceptible to communication errors. For example, a SMS message generally has a maximum size of approximately 125 bytes. Thus, it may take hundreds or even thousands of SMS messages to send a large UICC update in the kilobyte range to the UICC. Further, a failure of the mobile communication device to receive even one of these SMS messages may result in an incomplete UICC update to the UICC. This means that the wireless carrier network has to resend the UICC update for the UICC in its entirety to the mobile communication device.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to techniques for using a Trusted Execution Environment (TEE) of a user device to perform an update to a Universal Integrated Circuit Card (UICC) of the user device. In some instances, the UICC may also be referred to as a Subscriber Identity Module (SIM). A TEE is a secure execution environment isolated from other operational portions of the user device to prevent vulnerability from malicious software or operations. TEEs may interact with other operational portions of the user device via secure communications channels. Often, TEEs are guaranteed to be booted up first to ensure that malicious drivers loaded by a compromised operating system cannot compromise the TEE. Examples of TEEs include those that are specified by industry groups such as Global Platform, Trusted Computing Group, and/or so forth.

In operation, a UICC update service of the wireless communication network may notify a user device that a UICC update is available for the UICC of the user device. In turn, a trusted UICC update application in the TEE of the user device may open a secure communication session in the form of a HTTP Secure (HTTPS) session with the wireless communication network. Subsequently, the user device may use the HTTPS session to send a registration message that includes a trust credential from the TEE of the user device to the wireless communication network. Following the verification of the trust credential, the UICC update service of the wireless communication network may send a reply message indicating that the user device is validated. Accordingly, the trusted UICC update application in the TEE of the user device may receive the UICC update file via the HTTPS session. In alternative embodiments, the HTTPS session may be substituted with any alternative secure communication session that has sufficient capacity to send the UICC update file in a single transacted transfer. In turn, the trusted UICC update application may store the UICC update file in the TEE of the user device.

Subsequently, a modem function provided by a modem of the user device may retrieve a copy of the UICC update file from the TEE of the user device. In turn, the modem function may convert the copy of the UICC update file into multiple data chunks that emulate SMS messages, in which individual data chunks are equivalent to or less than in size to the size of a SMS message. The multiple data chunks of the UICC update are then sent by the modem function to the UICC of the user device to complete the update of the UICC.

The use of the TEE on a user device may enable a wireless communication network to bypass the conventional use of multiple SMS messages to send a UICC update to the UICC of a user device. In some instances, because of the relatively large size of the UICC updates, and the relatively small message capacity of SMS, these multiple SMS messages may number in the hundreds or even thousands for a single UICC update. Updating a UICC of a user device with such a large number of SMS messages is inherently unreliable. For example, a failure by the user device to receive even one of these SMS messages due to a network or device error may result in a failed update of the user device UICC. In turn, the failure may lead to a time consuming resend of all the SMS messages by the wireless communication network with the same risk of failure. On the other hand, the use of the TEE of a user device may enable the wireless communication network to securely send the UICC update as a single update package to the user device, thereby eliminating the risk of SMS messaging failure. The techniques described herein may be implemented in a number of ways. Example implementations are provided below with reference to the following figures.

Example Network Architecture

Figure 1:
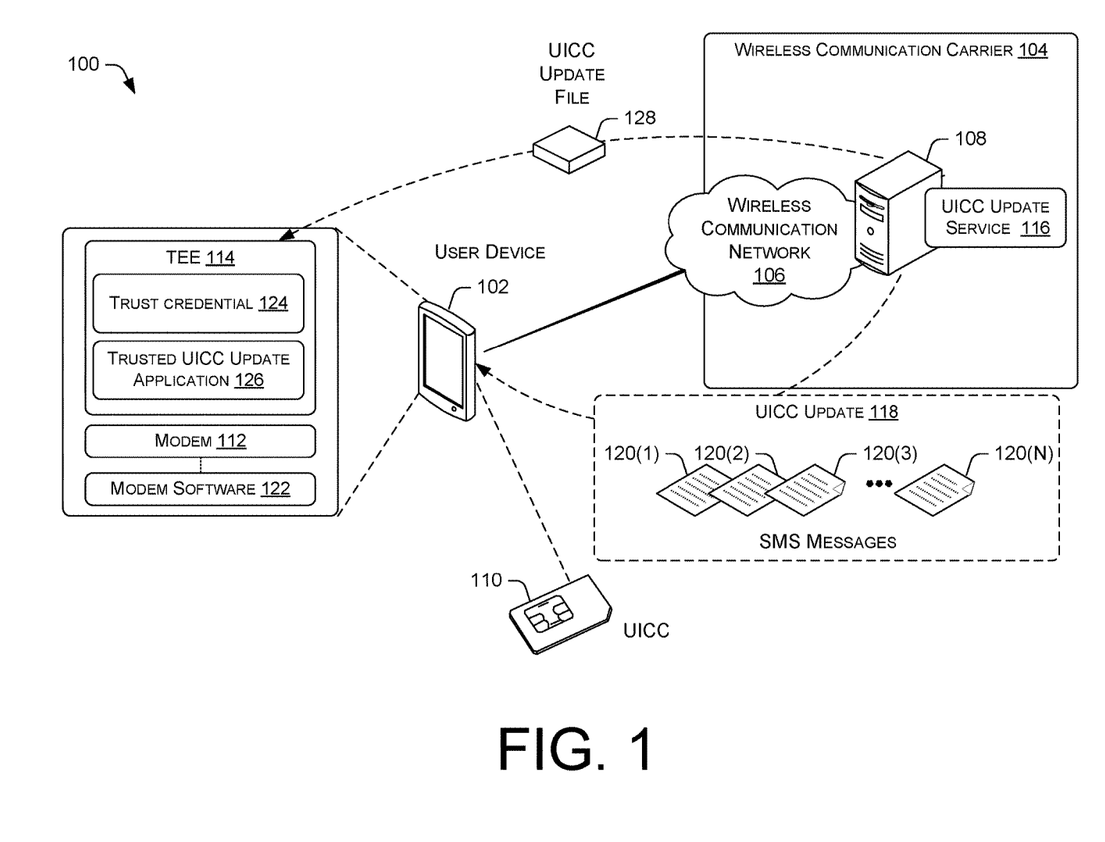
FIG. 1 illustrates an example network architecture for using a Trusted Execution Environment (TEE) of a user device to perform an update to a Universal Integrated Circuit Card (UICC) of the user device.

FIG. 1 illustrates an example network architecture for using a Trusted Execution Environment (TEE) of a user device to perform an update to a Universal Integrated Circuit Card (UICC) of the user device. The network architecture 100 may include a user device 102 and a wireless communication carrier 104. The wireless communication carrier 104 may operate a wireless communication network 106. The wireless communication network 106 may be a cellular network or alternatively a geographically disparate Wi-Fi network such as Project Fi™ by Google™. The wireless communication network 106 may include base stations and a core network. The base stations may be a part of the access network structure of the wireless communication network 106. The base stations are responsible for handling voice and data traffic between user devices, such as the user device 102 and the core network. Alternatively, the user device 102 may access the core network via other communication networks of the wireless communication carrier 104 and/or third-party providers that connect to the core network. The core network may provide telecommunication and data communication services to the user devices. For example, the core network may connect the user device 102 to other telecommunication and data communication networks. In various embodiments, the core network may include one or more servers 108 that perform multiple functions to support the operations of the wireless communication network 106.

The user device 102 may be smartphone, a tablet computer, or any other device that is capable of using a UICC 110 to obtain telecommunication and/or data communication services from the wireless communication network 106. In some embodiments, the UICC 110 may be an integrated circuit chip that stores information which uniquely identifies the UICC 110, as well as information for accessing the wireless communication network 106. Such information may include an integrated circuit card identifier (ICCID), an international mobile subscriber identity (IMSI) number, security authentication information, an operator profile that enables the UICC to authenticate with the wireless communication network 106. The UICC 110 may also store an applet that may be executed by an onboard processor of the UICC 110 to perform a specific task independently of the data processing capabilities of the user device 102. In other embodiments, the UICC 110 may be an embedded UICC that is directly wired to a circuit board of the user device. The user device 102 may further include a Trusted Execution Environment (TEE) 114 and a modem 112. The modem 112 is a hardware component that enables the user device 102 to perform telecommunication and data communication with the wireless communication network 106. Accordingly, the modem 112 may encode digital information for transmission in uplink radio signals to the wireless communication network 106, as well as decode digital information that are received from the wireless communication network 106 via downlink radio signals.

In the conventional UICC update scheme, a UICC update service 116 executing on the servers 108 may send a UICC update 118 for the UICC 110 to the user device 102 as a series of multiple SMS messages 120(1)-120(N) that contain UICC update data. In turn, the modem 112 of the user device 102 may receive the multiple SMS messages 120(1)-120(N). Subsequently, the data content of the SMS messages 120(1)-120(N) are then sent by the modem software 122 of the modem 112 to the UICC 110, such that the UICC 110 may assemble the SMS messages into the UICC update 118. The number of SMS messages 120(1)-120(N) for the UICC update 118 may potentially number in the hundreds or even thousands. For example, since a SMS message generally has a maximum size of approximately 125 bytes, a 40 kilobyte UICC update 118 may take more than 300 SMS messages to complete. However, updating the UICC 110 of the user device 102 with such a large number of SMS messages is inherently unreliable. A failure by the user device 102 to receive even one of these SMS messages 120(1)-120(N) due to a network or device error may result in a failed update of the UICC 110.

On the other hand, the use of the TEE 114 to update the UICC 110 with the UICC update 118 may be more reliable. In various embodiments, the UICC update service 116 of the wireless communication carrier 104 may use a trust credential 124 stored in the TEE 114 to validate the user device 102. Following the validation of the user device 102, the UICC update service 116 may prompt a trusted UICC update application 126 stored in the TEE 114 to request that a HTTP server of the wireless communication network 106 use a HTTPS session to securely send the UICC update 118 as a single UICC update file 128 to the TEE 114 of the user device 102. Subsequently, a modem function of the modem 112 may retrieve a copy of the UICC update file 128 from the TEE 114. The modem function may be provided by the modem software 122 of the modem 112, or a dedicated application that is called by the modem software 122 via an application program interface (API). The modem function may convert the copy of the UICC update file 128 into multiple data chunks that emulate SMS messages, in which individual data chunks are equivalent to or less than in size to the size of a SMS message. The multiple data chunks of the UICC update file 128 are then sent by the modem 112 to the UICC 110 of the user device 102 in the same manner as the SMS message 120(1)-120(N) to complete the update of the UICC. In this way, the transfer of the UICC update 118 as a single UICC update file 128 rather than the SMS messages 120(1)-120(N) may eliminate the chance of UICC update failure due to dropped or lost SMS messages.

Example User Device Components

Figure 2:
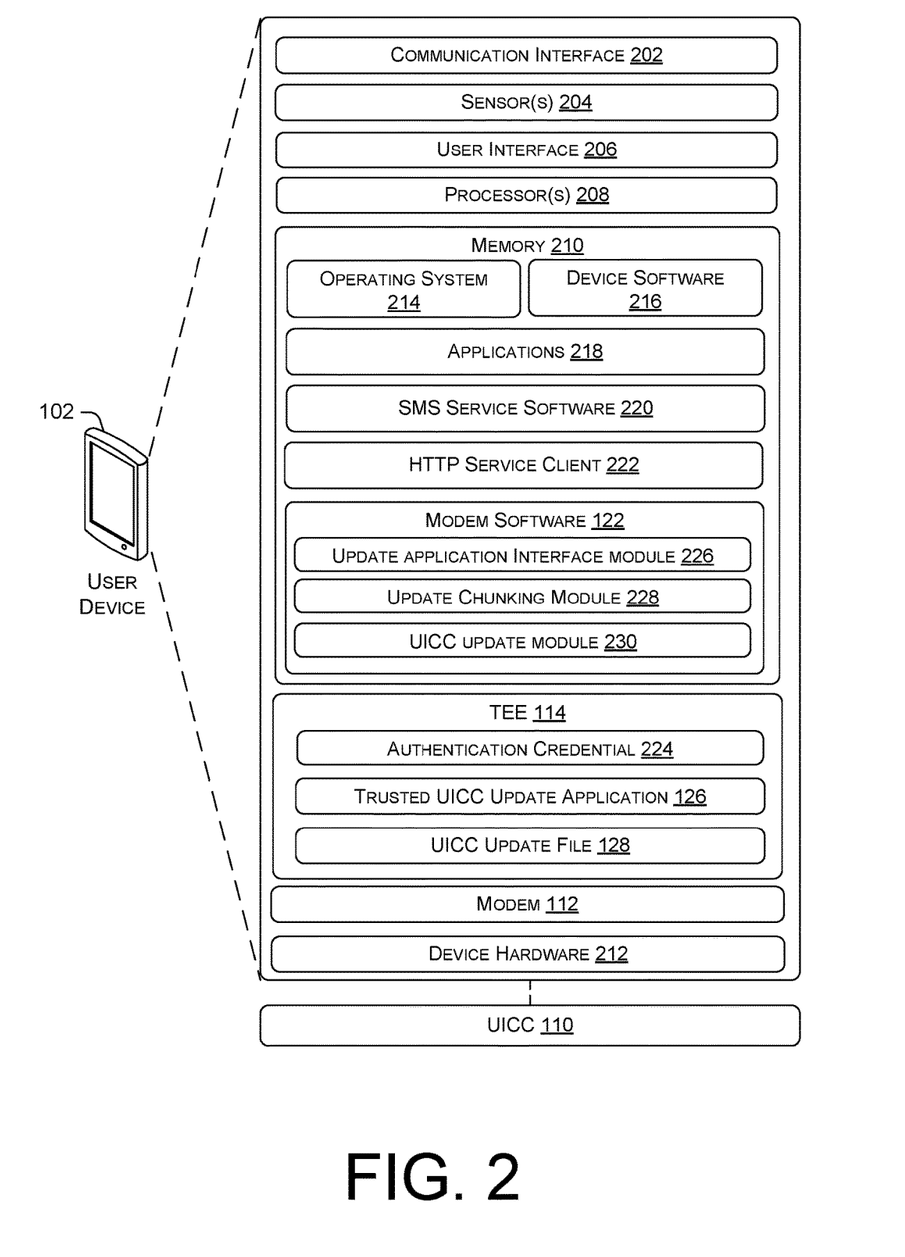
FIG. 2 is a block diagram showing various components of an illustrative user device that supports the TEE-based user device UICC update.

FIG. 2 is a block diagram showing various components of an illustrative user device that supports the TEE-based user device UICC update. The user device 102 may include a communication interface 202, one or more sensors 204, a user interface 206, one or more processors 208, and memory 210. The communication interface 202 may include wireless and/or wired communication components that enable the electronic device to transmit or receive voice or data communication via the wireless communication network 106, as well as other telecommunication and/or data communication networks. The sensors 204 may include a proximity sensor, a compass, an accelerometer, altimeter, and/or a global positioning system (GPS) sensor. The proximity sensor may detect movement of objects that are proximate the user device 102. The compass, the accelerometer, and the GPS sensor may detect orientation, movement, and geolocation of the user device 102.

The user interface 206 may enable a user to provide inputs and receive outputs from the user device 102. The user interface 206 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 210 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital optical disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The user device 102 may also include the modem 112 and other device hardware 212. As described above in FIG. 1, the modem 112 is a hardware component that enables the user device 102 to perform telecommunication and data communication with the wireless communication network 106. The device hardware 212 may include other hardware that is typically located in a mobile telecommunication device. For example, the device hardware 212 may include signal converters, antennas, hardware decoders and encoders, graphic processors, a UICC slot (e.g., SIM slot), and/or the like that enable the user device 102 to execute applications and provide telecommunication and data communication functions. The UICC 110 may be an integrated circuit chip that is inserted into the UICC slot of the user device 102, or an embedded UICC that is hardwired into the circuit board of the user device 102.

The one or more processors 208 and the memory 210 of the user device 102 may implement an operating system 214, device software 216, one or more applications 218, SMS service software 220, a HTTP service client 222, and the modem software 122. The various software and applications may include routines, program instructions, objects, and/or data structures that perform particular tasks or implement particular abstract data types. The operating system 214 may include components that enable the user device 102 to receive and transmit data via various interfaces (e.g., user controls, communication interface 202, and/or memory input/output devices). The operating system 214 may also process data using the one or more processors 208 to generate outputs based on inputs that are received via the user interface 206. For example, the operating system 214 may provide an execution environment for the execution of the applications 218. The operating system 214 may include a presentation component that presents the output (e.g., display the data on an electronic display, store the data in memory, transmit the data to another electronic device, etc.).

The operating system 214 may include an interface layer that enables applications to interface with the modem 112 and/or the communication interface 202. The interface layer may comprise public APIs, private APIs, or a combination of both public APIs and private APIs. Additionally, the operating system 214 may include other components that perform various other functions generally associated with an operating system. The device software 216 may include software components that enable the user device to perform functions. For example, the device software 216 may include basic input/output system (BIOS), Boot ROM, or a bootloader that boots up the user device 102 and executes the operating system 214 following power up of the device.

The applications 218 may include applications that provide utility, entertainment, and/or productivity functionalities to a user of the user device 102. For example, the applications 218 may include telephony applications, electronic mail applications, remote desktop applications, web browser applications, navigation applications, office productivity applications, multimedia streaming applications, and/or so forth.

The SMS service software 220 may provide the user device 102 with the ability to send and receive SMS messages from a Short Message Service Center (SMSC), such as a SMS server that resides on the wireless communication network 106. In various embodiments, the transmission of messages between the SMSC and the SMS service software 220 may be performed according to the Mobile Application Part (MAP) of the SS7 protocol. The size of the SMS messages may be constrained by the protocol to 140 octets or 1120 bits. The SMS messages may be encoded using a variety of alphabets, such as the GSM 7-bit alphabet, the 8-bit data alphabet, the 16-bit UCS-2 alphabet, and/or so forth. In some embodiments, the SMS messages that are passed between the SMS service software 220 and the SMSC may be encrypted and decrypted by both parties according to the SCP80 OTA secure channel protocol, or another equivalent secure SMS communication protocol.

The HTTP service client 222 may enable the user device 102 to establish a communication session with a server, such as a web server or a file service, using HTTP. HTTP is an application layer protocol that uses an underlying transport layer protocol, such as the Transmission Control Protocol (TCP), the User Datagram Protocol (UDP) and/or so forth. HTTP is a request-response protocol, in which the HTTP service client 222 may submit a HTTP request message, and the server may respond with a requested resource in a response message to the HTTP service client. In some embodiments, the HTTP service client may also use the HTTP Secure (HTTPS) protocol to communicate with a server, in which the communication session is encrypted by a security protocol, such as the Secure Socket Layer (SSL) protocol, the Transport Layer Security (TLS) protocol, and/or so forth.

The one or more processors 208 and the memory 210 of the user device 102 may further implement the TEE 114. The TEE 114 is an isolated execution space that is provided by dedicated software and/or hardware of a device. For example, the TEE 114 may employ a dedicated memory space or memory chip that is not accessible by applications and/or hardware components not located in the dedicated memory space or memory chip, unless such applications and/or hardware components are provided with special access privileges through secure communication channels and APIs. In alternative instances, the applications that reside in the TEE 114 may be executed by a dedicated processor. The isolation of the TEE 114 provides a high level of security for the execution of code or the processing of data stored in the execution space.

In various embodiments, the TEE 114 may store various authentication credentials 224 that include a device key, a modem key, and a public key of a public-private key pair. The device key may be unique to the user device 102. In some embodiments, the device key may be stored into the TEE 114 at the time the device is manufactured. In other embodiments, the device key may be generated on demand from a device seed value that is assigned to the user device 102 at the time of manufacture. Likewise, the modem key may uniquely identify the modem 112 that is installed in the user device 102. In some embodiments, the modem key may be assigned to the modem 112 at the time the modem 112 is manufactured. In other embodiments, the modem key may be generated on demand from a modem seed value that is assigned to the modem 112 at the time of manufacture.

The authentication credentials 224 stored in the TEE 114 may further include a trust credential 124. The trust credential 124 may be a unique trusted environment key that is assigned to the TEE 114 by the manufacturer of the hardware that implements the TEE 114. Furthermore, the identity of the user device 102, such as the International Mobile Station Equipment Identity (IMEI) of the user device, may also be known to the manufacturer of such hardware. In various embodiments, the trusted environment key and its relationship to the TEE 114, as well as its association with the user device 102, is also known to a trust authentication authority that may be called upon to validate the trusted environment key. The TEE 114 may also store a public key, e.g., a public certificate, of a public-private key pair, in which the private key of the public-private key pair is known to the UICC update service 116 of the wireless communication carrier 104. For example, the public key may be embedded into the dedicated memory space of the TEE 114 by the manufacturer of the TEE 114. The wireless communication carrier 104, in turn, may obtain the private key that corresponds to the public key from the manufacturer for storage in the servers 108. Accordingly, the authentication credentials 224 may be used by the trusted UICC update application 126 to obtain, validate, and decrypt UICC updates that are received from the UICC update service 116 using various techniques. These techniques may include asymmetric or symmetric encryption/decryption, message digest verification, trusted environment key verification, and/or so forth.

The trusted UICC update application 126 that resides in the TEE 114 may use the SMS service software 220 to provide the trust credential 124 to the wireless communication network 106. In turn, the wireless communication network 106 may validate the identity of the user device 102 with a trust authentication authority using the trust credential 124. The trusted UICC update application 126 may use the HTTP service client 222 to obtain a UICC update file, such as the UICC update file 128, from the UICC update service 116 of the wireless communication network 106. For example, the UICC update service 116 may use a HTTPS communication session to send the UICC update to the trusted UICC update application 126. In turn, the trusted UICC update application 126 may store the UICC update in the TEE 114.

The modem software 122 may drive the modem 112 to perform telecommunication and data communication with the wireless communication network 106. The modem software 122 may be firmware that is stored in dedicated non-volatile memory of the user device 102. Such non-volatile memory may include read-only memory (ROM), erasable programmable read-only memory (EPROM), or flash memory. As implemented on the user device 102, the modem software 122 may further include an update application interface module 226, an update chunking module 228, and a UICC update module 230.

The update application interface module 226 may interface with the trusted UICC update application 126 to retrieve a UICC update file, such as the UICC update file 128, from the TEE 114. For example, the trusted UICC update application 126 may provide an API that is callable by the update application interface module 226 to transfer a copy of the UICC update from the TEE 114 to a conventional memory space that is accessible to the modem software 122. The update chunking module 228 may chunk a copy of the UICC update that is retrieved from the TEE 114 into multiple data chunks. In various embodiments, the multiple data chunks may emulate SMS messages, in which individual data chunks are equivalent to or less than in size to the size of a SMS message.

In a conventional UICC update scheme, the UICC update module 230 may receive a UICC update in the form of SMS messages from the SMS service software 220. The SMS messages are then transferred by the UICC update module 230 to the UICC 110 via a dedicated UICC updated channel between the UICC 110 and the modem 112. Subsequently, the UICC 110 may assembly the SMS messages into a UICC update and install the UICC update.

In the TEE-based UICC update scheme, the UICC update module 230 may transfer the multiple data chunks that emulate SMS messages to the UICC 110 via the dedicated UICC update channel for assembly and installation by the UICC 110. Following the completed update of the UICC 110, the UICC may generate a successful installation notification. The successful installation notification may be intercepted by the UICC update module 230. In turn, the UICC update module 230 may notify the trusted UICC update application 126 to remove the UICC update file 128 from the TEE 114. The UICC update module 230 may also trigger the SMS service software 220 to send a successful UICC update notification to the UICC update service 116 on the wireless communication network 106. On the other hand, an installation failure notification from the UICC 110 may cause the UICC update module 230 to command the update application interface module 226 to retrieve another copy of the UICC update file 128 in order retry the UICC update. However, when a predetermined number of retries are exhausted without a successful UICC update installation, the UICC update module 230 may trigger the SMS service software 220 to send a UICC update failure notification to the UICC update service 116. Additional details regarding the various operations performed by the software and applications on the user device 102 are discussed in FIGS. 4-7.

Example Server Components

Figure 3:
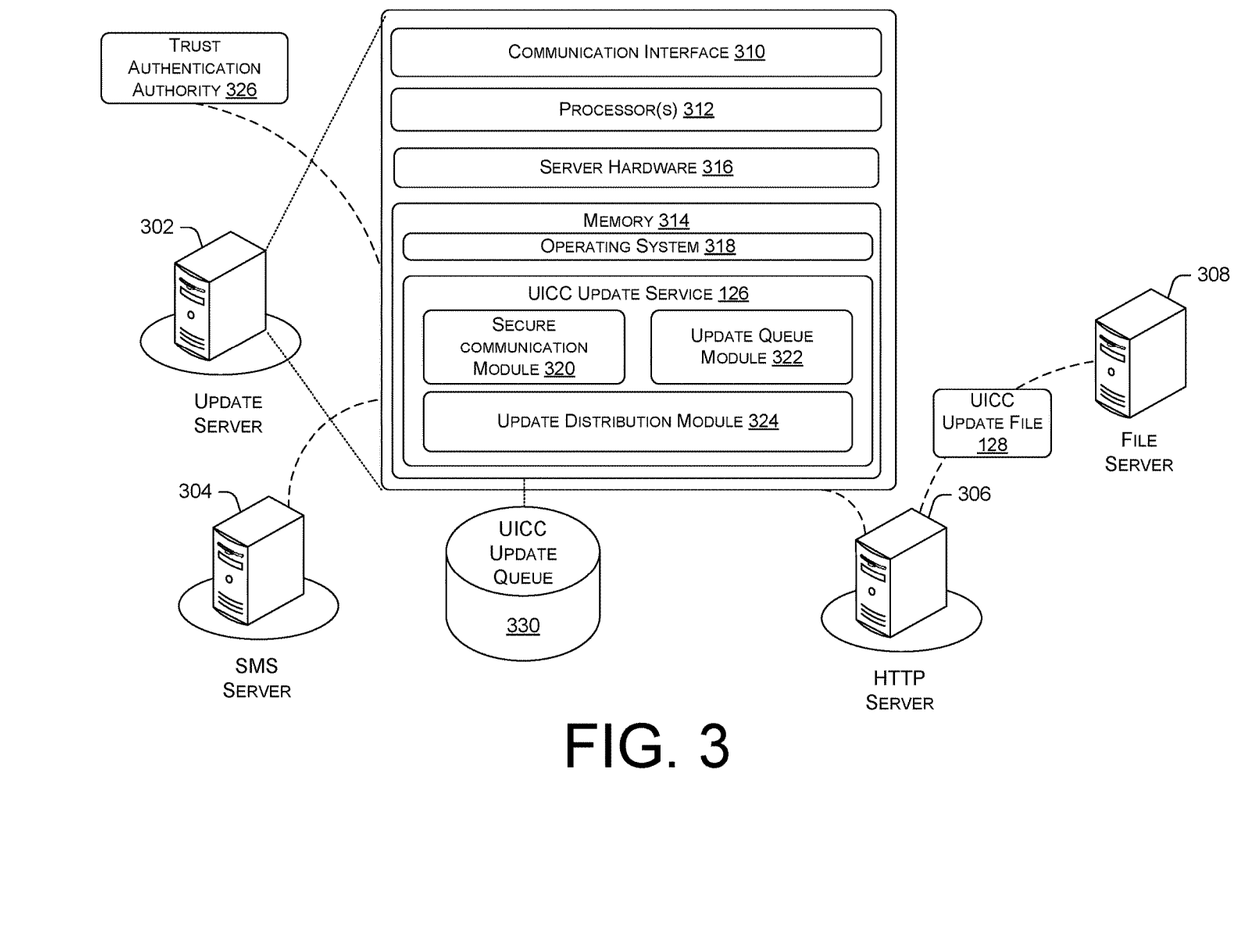
FIG. 3 is a block diagram showing various components of an illustrative wireless communication network that supports TEE-based user device UICC update.

FIG. 3 is a block diagram showing various components of the wireless communication network 106 that supports TEE-based user device UICC update. The components may include an update server 302, a SMS server 304, a HTTP server 306, and a file server 308. The update server 302 may include a communication interface 310, one or more processors 312, memory 314, and server hardware 316. The communication interface 310 may include wireless and/or wired communication components that enable the server to transmit data to and receive data from other networked devices via the wireless communication network 106. The server hardware 316 may include additional hardware that performs user interface, data display, data communication, data storage, and/or other server functions.

The memory 314 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital optical disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 312 and the memory 314 of the update server 302 may implement an operating system 318 and the UICC update service 116. The operating system 318 may include components that enable the update server 302 to receive and transmit data via various interfaces (e.g., user controls, communication interface, and/or memory input/output devices), as well as process data using the processors 312 to generate output. The operating system 318 may include a presentation component that presents the output (e.g., display the data on an electronic display, store the data in memory, transmit the data to another electronic device, etc.). Additionally, the operating system 318 may include other components that perform various additional functions generally associated with an operating system.

The UICC update service 116 may include a secure communication module 320, an update queue module 322, and an update distribution module 324. The secure communication module 320 may be responsible for sending an integrity protected and encrypted UICC update file, such as the UICC update file 128, to a user device. For example, the secure communication module 320 may store the device key, the modem key of the user device 102 in a key database. In addition, the key database may store a private key and public key counterparts that are stored in the TEE 114 of the user device 102. Accordingly, the secure communication module 320 may use the various keys to perform the integrity protection and the encryption of the UICC update file.

The secure communication module 320 may also have the ability to request verification of a trust credential (e.g., a trusted environment key) as belong to a particular user device (e.g., user device 102) from a trust authentication authority 326. The trust authentication authority 326 may be a third-party service or a service operated by the wireless communication carrier 104. For example, the secure communication module 320 may send a verification request to a verification server at the trust authentication authority 326. The verification request may include a device key of a user device (e.g., the user device 102) and a trust credential (e.g., the trusted environment key). In turn, the trust authentication authority 326 may send back an indication that the trust credential is valid if the trust credential belongs to the user device, i.e., the device key and the trusted environment key are determined by the authority as associated with the same user device. Otherwise, the trust authentication authority 326 may indicate to the secure communication module 320 that the trust credential is invalid. The invalidity indication may cause the secure communication module 320 to generate an alert event. The alert event may trigger a notification to be displayed on a user interface. The notification may call for an administrator to perform a corrective action, such as an investigation or a manual intervention. Alternatively, the alert event may trigger an automatic mechanism of the wireless communication carrier 104 to perform a troubleshooting action.

The update queue module 322 may check a UICC update queue 330 to determine whether a UICC update is ready for a user device. The UICC update queue 330 may be part of information databases maintained by the wireless communication carrier 104. The information databases may store device information on the user devices of the subscribers that are serviced by the wireless communication network 106. For example, the device information for a user device may include data on device features, device hardware and software specifications, device network compatibility, device configuration information, and/or so forth. In various embodiments, the information databases may include databases that are maintained by the wireless communication carrier 104, databases that are maintained by a third-party device manufacturer, databases that are maintained by a third-party operator, and/or so forth. Accordingly, when the update queue module 322 retrieves information from the UICC update queue 330 indicating that a UICC update is ready for a user device, the update queue module 322 may trigger the SMS server 304 to send a SMS message to the user device. In some embodiments, the SMS server 304 may use the SCP80 OTA secure channel protocol, or another equivalent secure SMS communication protocol, to encrypt and decrypt SMS messages that are passed between the SMS server 304 and SMS service software 220.

The update distribution module 324 may receive a request for a UICC update file, such as the UICC update file 128, via a HTTPS session. In turn, the update distribution module 324 may retrieve the UICC update file from a file server 308 that stores different UICC update files for multiple user devices. Subsequently, the update distribution module 324 may transmit the UICC update file to the user device via the HTTPS session. In response to an incoming SMS message from the user device indicating that the SMS update file is installed, the update distribution module 324 may update a device record in the UICC update queue 330 to indicate that the UICC update has been installed on the user device. However, upon receiving a SMS message from the user device 102 indicating that the installation failed, the update distribution module 324 may generate an alert event. The alert event may trigger a notification to be displayed on a user interface. The notification may call for an administrator to perform a corrective action, such as an investigation or a manual intervention. Alternatively, the alert event may trigger an automatic mechanism of the wireless communication carrier 104 to perform a troubleshooting action.

While the UICC update service 116 is illustrated as being implemented on the update server 302, the UICC update service 116 may be implemented on any other servers of the wireless communication carrier 104 in other embodiments. For example, the UICC update service 116 may be implemented on servers that perform core network and/or backhaul functions for the wireless communication network 106. Further, while the SMS communication function, the HTTP communication function, and the file serving function are illustrated as implemented by discrete servers 304-308, such functions may also be servers that are executed by a single server in some embodiments. Additional details regarding the various operations performed by these components of the wireless communication network 106 are discussed in FIGS. 4-7.

Protocol Flow

Figure 4:
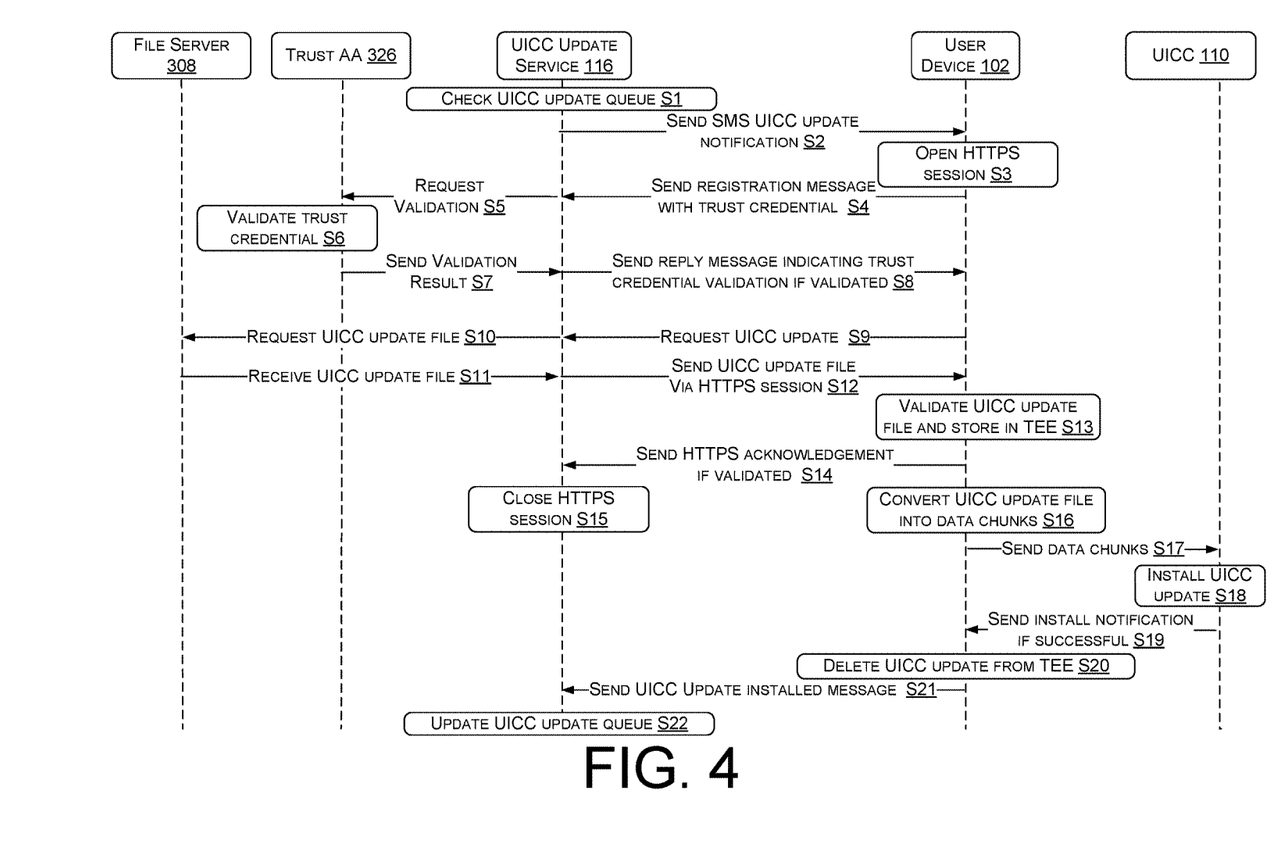
FIG. 4 is a diagram that shows protocol flow for using the TEE of a user device to perform an update to a UICC of a user device.

FIG. 4 is a diagram that shows protocol flow for using the TEE of a user device to perform an update to a UICC of a user device. The procedure may include steps that exchange data between the user device 102, the UICC 110, the UICC update service 116, the trust authentication authority 326, and the file server 308. At step S1, the UICC update service 116 of the wireless communication network 106 may check the UICC update queue 330 to determine whether a pending UICC update is available for the user device 102. At step S2, if the UICC update queue 330 indicates that a UICC update is available, the UICC update service 116 may send a SMS message to the user device 102 indicating that a UICC update is ready for the device. In some instances, the SMS message may be encrypted via a SMS encryption protocol.

At step S3, the user device 102 may receive the SMS message via the SMS service software 220. In turn, the trusted UICC update application 126 may decrypt the SMS message to obtain the content of the message. In response to the SMS message, the trusted UICC update application 126 may prompt the HTTP service client 222 to open a HTTPS session with the SMS server 304 of the wireless communication network 106. At step S4, the trusted UICC update application 126 may prompt the SMS service software 220 to send a registration message to the UICC update service 116 via the HTTPS session. The registration message may prompt the UICC update service 116 to verify that the user device 102 is authorized to receive the UICC update. The registration message may include the trust credential 124 of the TEE 114 that is on the user device 102. At step S5, the UICC update service 116 may decrypt the registration message to obtain the content of the message. In turn, the UICC update service 116 may send a verification request that includes the trust credential 124 to the trust authentication authority 326 via a secure communication channel.

At step S6, the trust authentication authority 326 may validate the trust credential 124. In various embodiments, the verification request may include a device key of the user device 102 and the trust credential 124. In turn, the trust authentication authority 326 may determine if the trust credential 124 belongs to the user device 102, i.e., the device key and the trusted environment key are associated with the same user device. Thus, at step S7, if the device key and the trusted environment key are associated with the user device, the trust authentication authority 326 may send back an indication that the user device 102 is validated for receiving the UICC update. Otherwise, the trust authentication authority 326 may send back an indication that the user device 102 is not authorized to receive the UICC update.

At step S8, assuming that the user device 102 is validated, the UICC update service 116 may send a reply message via the HTTPS session indicating that the device is validated for receiving the UICC update. At step S9, the trusted UICC update application 126 on the user device may receive the reply message. In response to the message content of the reply message, the trusted UICC update application 126 may send a request for the UICC update to the UICC update service 116 via the HTTPS session.

At step S10, the UICC update service 116 may request a UICC update file that corresponds to the UICC update, such as the UICC update file 128 from the file server 308. At step S11, the UICC update service 116 may receive the UICC update file from the file server 308. At step S12, the UICC update service 116 may send the UICC update file to the user device 102 via the HTTPS session. In various embodiments, the UICC update file may be integrity protected and encrypted by the UICC update service 116 prior to being sent to the user device.

At step S13, the UICC update service 116 may validate the UICC update file and store the validated file in the TEE 114. The validation may include the trusted UICC update application 126 decrypting the encrypted UICC update file and verifying that the integrity protection of the UICC update file is valid. At step S14, the validation of the UICC update file may cause the trusted UICC update application 126 to store the UICC update file in the TEE 114. Subsequently, the trusted UICC update application 126 may use the HTTPS session to send a HTTPS acknowledgment indicating that the UICC update file has been received. In response, at step S15, the UICC update service 116 may prompt the SMS server 304 to close the HTTPS session. On the other hand, the inability to validate the UICC update file may cause the trusted UICC update application 126 to use the HTTPS session to request another copy of the UICC update file to be sent to the user device 102.

At step S16, the modem software 122 may retrieve a copy of the UICC update file from the TEE 114 for storage in a conventional memory space of the user device 102 that is accessible to the modem software 122. Subsequently, the modem software 122 may convert the copy of the UICC update file into multiple data chunks that emulate SMS messages, in which individual data chunks are equivalent to or less than in size to the size of a SMS message.

At step S17, the modem software 122 may send the data chunks that emulate SMS messages to the UICC 110 via a communication channel between the modem 112 and the UICC 110. At step S18, the UICC 110 may assemble the data chunks into a UICC update and then install the UICC update. At S19, the UICC 110 may send a successful installation notification to the trusted UICC update application 126 of the user device 102 if the UICC 110 is able to install the UICC update. However, if the UICC 110 is unable to install the UICC update, the UICC 110 may send an installation failure notification to the modem software 122. In turn, the modem software 122 may retrieve another copy of the UICC update file from the TEE 114 for conversion into emulated SMS messages for distribution to the UICC 110.

At step S20, in response to receiving the successful installation notification, the modem software 122 may send a notification to the trusted UICC update application 126. The notification may trigger the trusted UICC update application 126 to delete the UICC update file from the TEE 114. At step S21, the modem software 122 may trigger the SMS service software 220 of the user device 102 to send a UICC update installed SMS message to the UICC update service 116. In some embodiments, such a SMS message may be encrypted via a secure SMS communication protocol. At step S22, the UICC update service 116 may update the UICC update queue 330 of the wireless communication network 106 to indicate that the pending UICC update of the user device 102 is completed.

Example Processes

Figure 5:
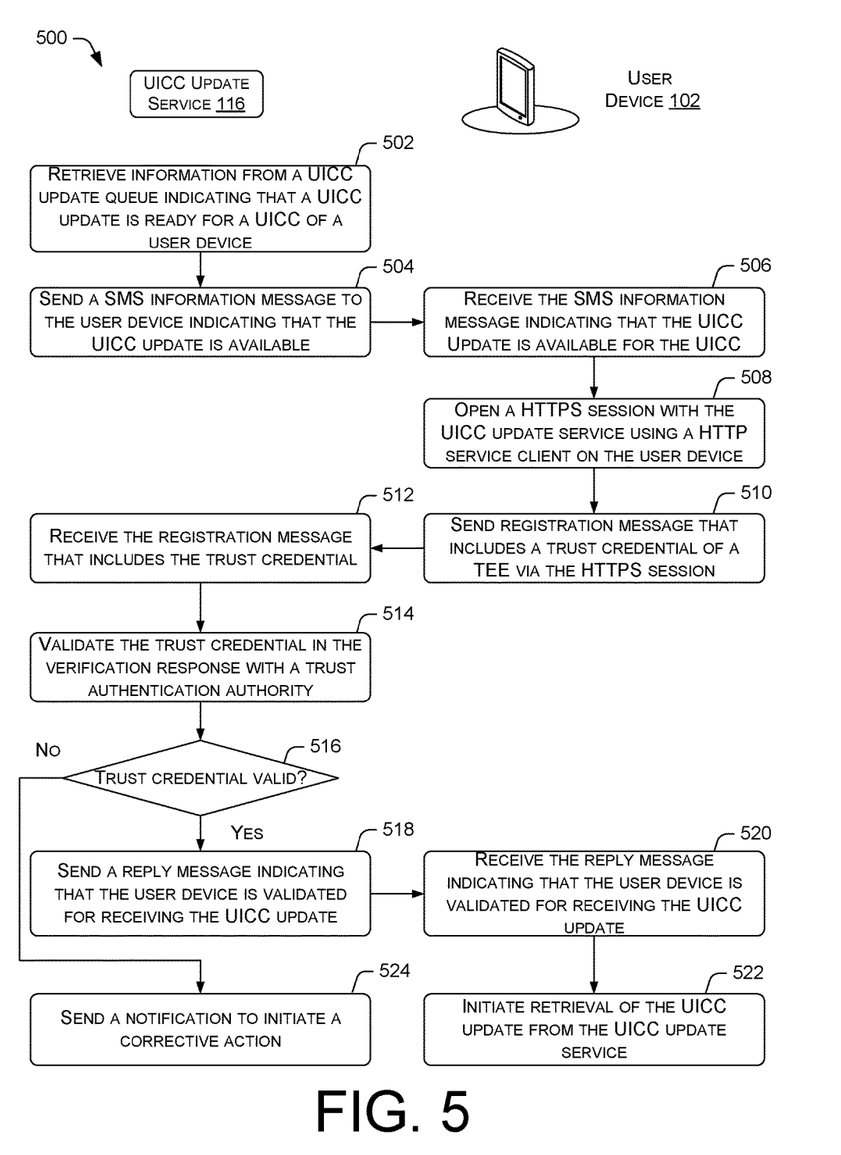
FIG. 5 is a flow diagram of an example process for an update server of a wireless communication carrier to initiate a TEE-based UICC update to a user device.
Figure 6:
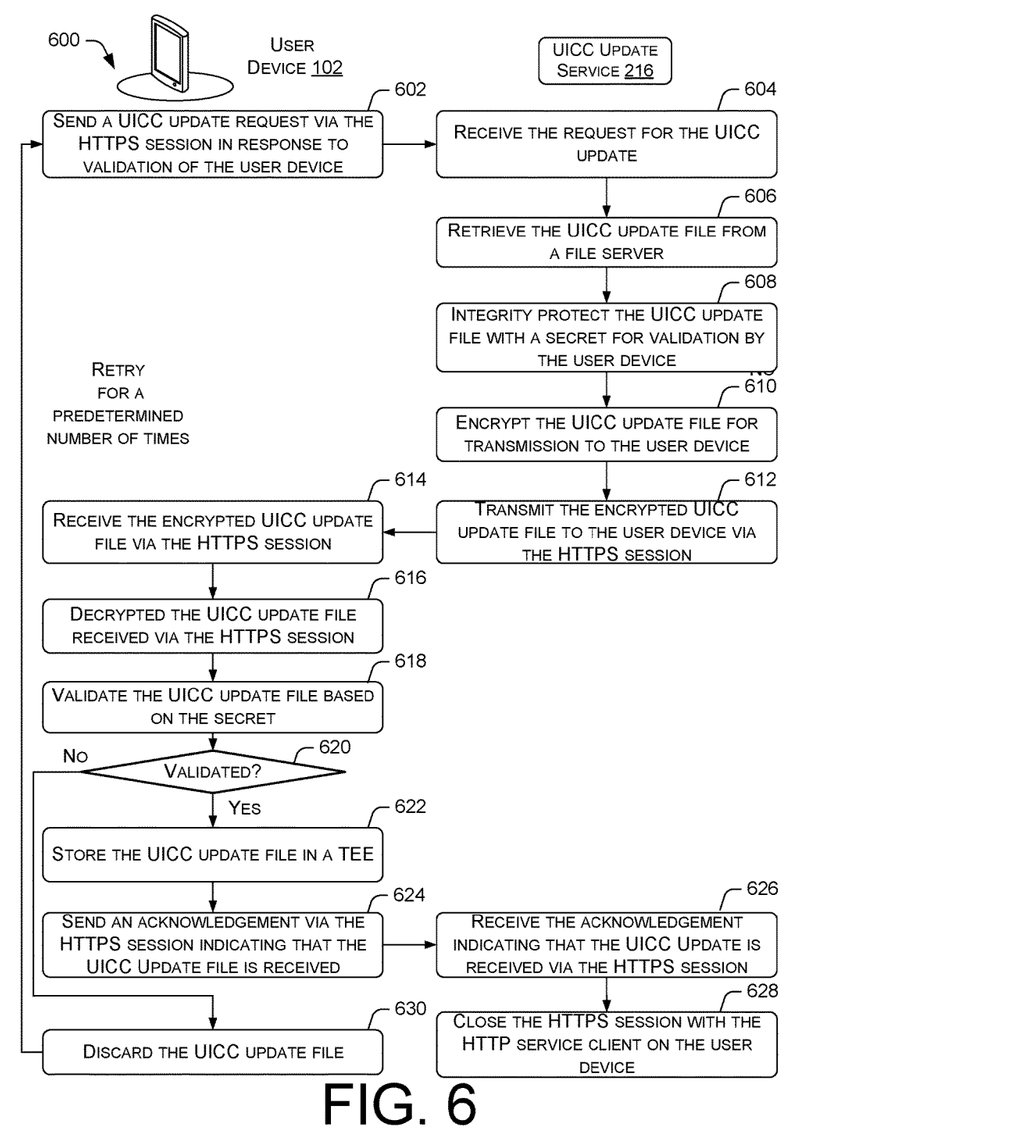
FIG. 6 is a flow diagram of an example process for using a HTTP Secure (HTTPS) connection to transfer a UICC update from the wireless communication carrier to the TEE of a user device.
Figure 7:
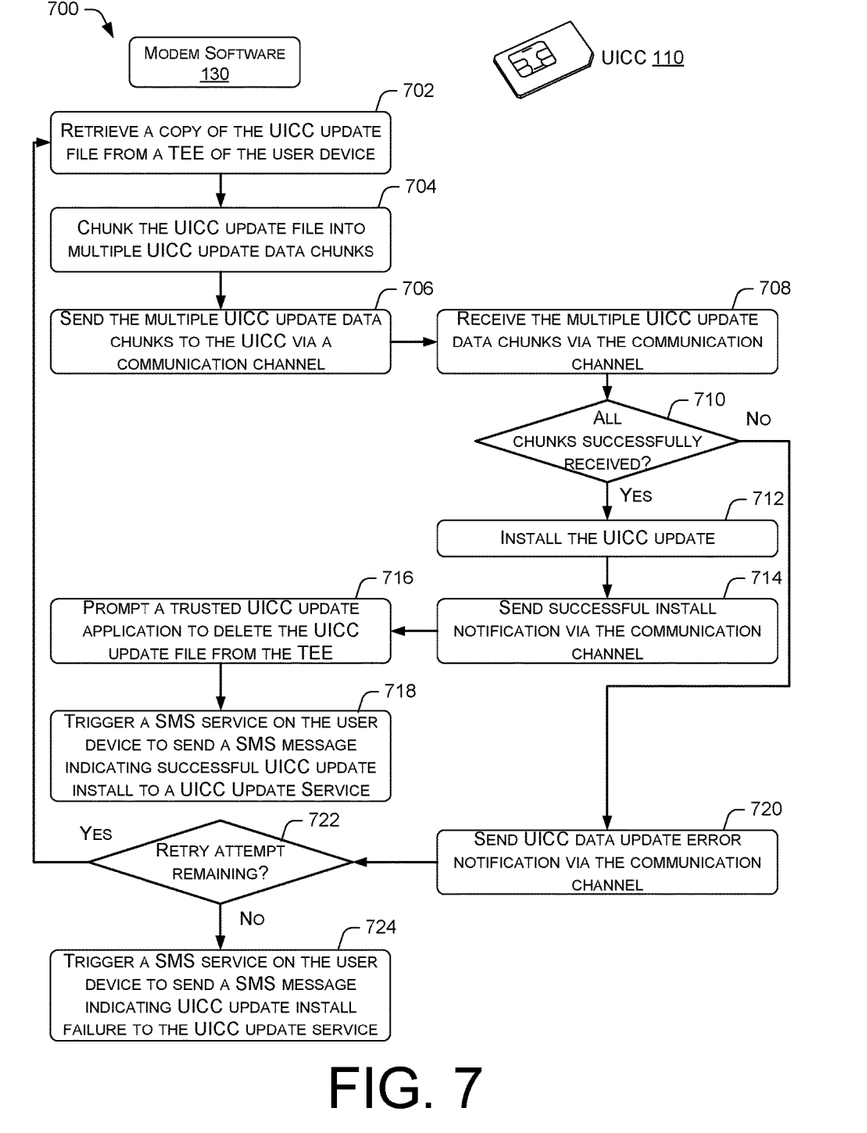
FIG. 7 is a flow diagram of an example process for updating a UICC associated with the user device with a UICC update from the TEE of the user device.

FIGS. 5-7 present illustrative processes 500-700 for using a Trusted Execution Environment (TEE) of a user device to perform an update to a Universal Integrated Circuit Card (UICC) of the user device. Each of the processes 500-700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500-700 are described with reference to the network architecture 100 of FIG. 1.

FIG. 5 is a flow diagram of an example process 500 for an update server of a wireless communication carrier to initiate a TEE-based UICC update to a user device. At block 502, the UICC update service 116 may retrieve information from the UICC update queue 330 indicating that a UICC update is available for the UICC 110 of the user device 102. At block 504, the UICC update service 116 may send a SMS information message to the user device indicating that the UICC update is available. At block 506, the user device 102 may receive the SMS information message indicating that the UICC update is available for the UICC 110 of the user device. At block 508, the trusted UICC update application 126 on the user device 102 may use the HTTP service client 222 to open a HTTPS session with the UICC update service 116 via the HTTP server 306 of the wireless communication network 106. At block 510, the user device 102 may use the HTTPS session to send a registration message that includes the trust credential 124 from the TEE 114 of the user device 102 to the UICC update service 116.

At block 512, the UICC update service 116 may receive the registration message that includes the trust credential 124. At block 514, the UICC update service 116 may validate the trust credential 124 in the registration message. In various embodiments, the validation may be performed by the trust authentication authority 326 for the UICC update service 116. At decision block 516, if the UICC update service 116 determines that the trust credential is validated, the process 500 may proceed to block 516. At block 518, the UICC update service 116 may send a reply message indicating that the user device is validated for receiving the UICC update via the HTTPS session. At block 520, the user device 102 may receive the reply message indicating that the user device is validated for receiving the UICC update. At block 522, the user device 102 may initiate retrieval of the UICC update from the UICC update service 116.

Returning to decision block 516, if the UICC update service 116 determines that the trust credential is invalid, the process 500 may proceed to block 524. At block 522, the UICC update service 116 may generate an alert event. The alert event may trigger a notification to be displayed on a user interface. The notification may call for an administrator to perform a corrective action, such as an investigation or a manual intervention. Alternatively, the alert event may trigger an automatic mechanism of the wireless communication carrier 104 to perform a troubleshooting action.

FIG. 6 is a flow diagram of an example process 600 for using a HTTP Secure (HTTPS) connection to transfer a UICC update from the wireless communication carrier to the TEE of a user device. At block 602, in response to a notification that the user device 102 is validated to receive a UICC update, the trusted UICC update application 126 may send a UICC update request via the HTTPS session. For example, the user device 102 may receive the notification as described in block 520 of the flow diagram 500. At block 604, the UICC update service 116 may receive the request for the UICC update from the user device 102. At block 606, the UICC update service 116 may retrieve the UICC update file from the file server 308 of the wireless communication network 106.

At block 608, the UICC update service 116 may integrity protect the UICC update file with a secret for validation by the user device 102. In various embodiments, the secret may be a unique key or credential that is embedded in the user device 102 and known to the UICC update service 116. For example, the secret may be used to calculate a message digest or a message authentication code that is embedded with the UICC update file.

At block 610, the UICC update service 116 may encrypt the UICC update file for transmission to the user device 102. In various embodiments, the UICC update service 116 may encrypt the UICC update file with a unique key that is used for symmetric or asymmetric encryption, in which the UICC update file may be decrypted with a counterpart key held by the user device 102.

At block 612, the UICC update service 116 may use the HTTPS session to transmit the encrypted UICC update file to the user device 102. At block 614, the user device 102 may receive the encrypted UICC update file via the HTTPS session. At block 616, the trusted UICC update application 126 on the user device 102 may decrypt the UICC update file that is received via the HTTPS session. At block 618, the trusted UICC update application 126 may validate the UICC update file based on the secret. For example, the secret may be used to independently calculate a verification message digest or a verification message authentication code. Accordingly, the trusted UICC update application 126 may determine that the UICC update file is valid when the verification message digest or verification authentication code matches its counterpart received with the UICC update file.

At decision block 620, the trusted UICC update application 126 may determine whether the UICC update file is validated. Accordingly, if the UICC update file is validated, the process 600 may proceed to block 622. At block 622, the trusted UICC update application 126 may store the UICC update file in the TEE 114. At block 624, the trusted UICC update application 126 may send an acknowledgement via the HTTPS session indicating that the UICC update file is received. At block 626, the UICC update service 116 may receive the acknowledgment indicating that the UICC update is received via the HTTPS session. At block 628, the UICC update service 116 may prompt the HTTP server 306 to close the HTTPS session with the HTTP service client 222 on the user device 102.

Returning to decision block 620, if the UICC update file is not validated, the process 600 may proceed to block 630. At block 630, the trusted UICC update application 126 may discard the UICC update file. Subsequently, the process 600 may loop back to block 602 such that the trusted UICC update application 126 may initiate another HTTPS session to send another UICC update request to the UICC update service 116. In various embodiments, the trusted UICC update application 126 may perform such retries for a predetermined number of times. In some instances, if the trusted UICC update application 126 is unable to obtain a validated UICC update file within the predetermined number of retries, the trusted UICC update application 126 may send an update failure notification to the UICC update service 116 via the HTTPS session. In response, the UICC update service 116 may close the HTTPS session and generate an alert event. The alert event may trigger a notification to be displayed on a user interface. The notification may call for an administrator to perform a corrective action, such as an investigation or a manual intervention. Alternatively, the alert event may trigger an automatic mechanism of the wireless communication carrier 104 to perform a troubleshooting action.

FIG. 7 is a flow diagram of an example process 700 for updating a UICC associated with the user device with a UICC update from the TEE of the user device. At block 702, the modem software 122 may retrieve a copy of the UICC update file from a TEE 114 of the user device 102. In various embodiments, the modem software 122 may call an API provided by the trusted UICC update application 126 to retrieve the copy of the UICC update file from the TEE 114. At block 704, the modem software 122 may chunk the UICC update file into multiple data chunks. In various embodiments, the multiple data chunks may emulate SMS messages, in which individual data chunks are equivalent to or less than in size to the size of a SMS message.

At block 706, the modem software 122 may send the multiple UICC update data chunks to the UICC 110 via a communication channel between the user device 102 and the UICC 110. At block 708, the UICC 110 may receive the multiple UICC update data chunks via the communication channel in a sequential manner. At decision block 710, the UICC 110 may determine whether all of the data chunks are successfully received. Accordingly, if the UICC 110 determines that all data chunks are successfully received, the process 700 may proceed to block 712. At block 712, the UICC 110 may assemble the data chunks into a UICC update and install the UICC update.

At block 714, the UICC 110 may send a successful install notification to the modem software 122 via the communication channel. At block 716, the modem software 122 may receive the successful install notification via the communication channel. In response, the modem software 122 may prompt the trusted UICC update application 126 to delete the UICC update file from the TEE 114 of the user device 102. At block 718, the modem software 122 may trigger the SMS service software 220 on the user device 102 to send a SMS message to the UICC update service 116. The SMS message may indicate the successful installation of the UICC update on the user device 102. In turn, the UICC update service 116 may update the UICC update queue 330 of the wireless communication network 106 to indicate that the pending UICC update of the user device 102 is completed.

Returning to decision block 710, if the UICC 110 determines that one or more of the chunks are missing, the process 700 may proceed to block 720. At block 720, the UICC 110 may send a UICC data update error notification via the communication channel to the modem software 122. At decision block 722, upon receiving the error notification, the modem software 122 may determine whether to retry the transfer of the UICC update file to the UICC 110. The modem software 122 may be configured to make a predetermined retry attempts before sending an install failure notification to the UICC update service 116. Accordingly, the modem software 122 may make the determination based on whether there are any retry attempts remaining. Thus, if the modem software 122 determines that there are retry attempts remaining, the process 700 may loop back to block 702, such that the modem software 122 may restart the process 700 by retrieving the UICC update file from the TEE 114 of the user device 102. However, if the modem software 122 determines that they are no more retry attempts remaining, the process 700 may proceed to block 724.

At block 724, the modem software 122 may trigger the SMS service software 220 on the user device 102 to send a SMS message indicating UICC update install failure to the UICC update service 116. In turn, the UICC update service 116 may generate an alert event. The alert event may trigger a notification to be displayed on a user interface. The notification may call for an administrator to perform a corrective action, such as an investigation or a manual intervention. Alternatively, the alert event may trigger an automatic mechanism of the wireless communication carrier 104 to perform a troubleshooting action.

The use of the TEE on a user device may enable a wireless communication network to bypass the conventional use of multiple SMS messages to send a UICC update to the UICC of a user device. In some instances, these multiple SMS messages may number in the hundreds or even thousands for a single UICC update. Updating a UICC of a user device with such a large number of SMS messages is inherently unreliable. For example, a failure by the user device to receive even one of these SMS messages due to a network or device error may result in a failed update of the user device UICC. In turn, the failure may lead to a time consuming resend of all the SMS messages by the wireless communication network with the same risk of failure. On the other hand, the use of the TEE of a user device may enable the wireless communication network to securely send the UICC update as a single update package to the user device, thereby eliminating the risk of SMS messaging failure.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
sending from a trusted update application that is executing in a Trusted Execution Environment (TEE) of a user device, a Universal Integrated Circuit Card (UICC) update request to a UICC update service of a wireless communication network via a secure communication session;
storing a UICC update file that is received from the UICC update service of the wireless communication network via the secure communication session in the TEE of the user device;
transferring a copy of the UICC update file from the TEE of the user device to modem software associated with a modem of the user device; and
sending the UICC update file from the modem to the UICC of the user device via a communication channel between the user device and the UICC to update the UICC.

2. The computer-implemented method of claim 1, further comprising chunking the UICC update files into multiple UICC update data chunks via the modem software, in which individual UICC update data chunks are equivalent to or less than in size to a maximum Short Message Service (SMS) message size, and wherein the sending includes sending the multiple UICC update data chunks to the UICC of the user device via the communication channel.

3. The computer-implemented method of claim 1, further comprising, prior to the sending of the UICC update request from the trusted update application:
receiving a SMS information message indicating that a UICC update is available for UICC of the user device;
establishing the secure communication session between the user device and the UICC update service;
sending, based on a prompt from the trusted update application, a registration message to the UICC update service via the secure communication session in response to the SMS information message that includes a trust credential of the TEE on the user device; and
receiving a reply message from the UICC update service via the secure communication session indicating that the user device is validated for receiving the UICC update following a validation of the trust credential as being associated with the user device by a trusted authentication authority, the reply message prompting the sending of the UICC update request.

4. The method of claim 3, wherein the SMS information message is encrypted and decrypted by the trusted update application and the UICC update service of the wireless communication network using SCP80 OTA secure channel protocol.

5. The method of claim 1, wherein the sending includes sending the UICC update request in response to the trusted update application receiving an update notification from the wireless communication network, the update notification being initiated based on a UICC update queue of the wireless communication network indicating a UICC update is available for the UICC of the user device.

6. The method of claim 5, further comprising:
receiving a successful installation notification from the UICC via the communication channel following an assembly of multiple UICC update data chunks into a UICC update and installation of the UICC update on the UICC;
deleting the UICC update file from the TEE of the user device; and
sending a SMS notification message indicating successful UICC update install to the UICC update service on the wireless communication network, such that the UICC update service updates the UICC update queue to show that the UICC update is installed on the UICC.

7. The method of claim 1, further comprising:
receiving a UICC data update error notification from the UICC via the communication channel in following a failure of the UICC to at least one of assembling multiple UICC update data chunks into a UICC update or installing the UICC update on the UICC; and
transferring another copy of the UICC update file from the TEE of the user device to the modem software in response to the UICC data update error notification.

8. The method of claim 1, wherein the UICC update file is integrity protected and encrypted by the UICC update service of the wireless communication network for transmission to the user device via the secure communication session, and wherein the trusted update application is to store the UICC update file in the TEE following integrity protection validation of a decrypted version of the UICC update file.

9. The method of claim 8, further comprising, following storage of the UICC update file in the TEE, sending an acknowledgment via the secure communication session to the UICC update service indicating that the UICC update file is received by the user device to prompt the UICC update service to close the secure communication session.

10. The method of claim 7, wherein UICC update file is encrypted via asymmetric key encryption or symmetric key encryption.

11. The method of claim 1, wherein the transferring includes the modem software requesting via an application program interface (API) of the trusted update application for the trusted update application to provides the copy of the UICC update file from the TEE to the modem software.

12. The method of claim 1, wherein updating the UICC of the user device via the UICC update file is a substitute for updating the UICC of the user device via multiple SMS messages that are sent by the wireless communication network to the user device.

13. One or more non-transitory computer-readable media storing computer-executable instructions that upon execution cause one or more processors to perform a plurality of acts, comprising:
retrieving, via a Universal Integrated Circuit Card (UICC) update service of a wireless communication network, information from a UICC update queue of the wireless communication network indicating that a UICC update is ready for a UICC of a user device;
sending, under a direction of the UICC update service, a Short Message Service (SMS) information message to the user device indicating that the UICC update is available;
receiving, by the UICC update service, a registration message from a trusted update application in a Trusted Execution Environment (TEE) of the user device in response to the SMS information message, the registration message including a trust credential of the TEE on the user device;
sending, under a direction of the UICC update service, a reply message indicating that the user device is validated for receiving the UICC update in response to a validation of the trust credential as being associated with the user device by a trusted authentication authority, the reply message prompting the user device to request the UICC update; and
sending, under a direction of the UICC update service, a UICC update file via a secure communication session to the user device in response to the request for the UICC update, the UICC update file to be stored by the trusted update application in the TEE of the user device for distribution to the UICC via a communication channel between the user device and the UICC.

14. The one or more non-transitory computer-readable media of claim 13, wherein the plurality of acts further comprise generating a notification for an administrator of the wireless communication network to take corrective action in response to the trusted authentication authority failing to validate that the trust credential is associated with the user device.

15. The one or more non-transitory computer-readable media of claim 13, wherein the SMS information message is encrypted and decrypted by the trusted update application and the UICC update service of the wireless communication network using SCP80 OTA secure channel protocol, and wherein the secure communication session is a HTTP Secure (HTTPS) session that is established between the user device and the UICC update service via a SMS server of the wireless communication network and a HTTP service client of the user device, such that the registration message and the reply message are carried via the HTTPS session.

16. The one or more non-transitory computer-readable media of claim 13, wherein the secure communication session is a HTTP Secure (HTTPS) session that is established between the user device and the UICC update service via a SMS server of the wireless communication network and a HTTP service client of the user device, and wherein sending the UICC update file includes:
transmitting an integrity protected and encrypted version of the UICC update file to the trusted update application of the user device via the HTTPS session; and
closing the HTTPS session in response to an acknowledgment from the trusted update application received via the HTTPS session indicating that the UICC update is received, the acknowledgment being sent by the trusted update application following a validation of integrity protection for a decrypted version of the UICC update file.

17. The one or more non-transitory computer-readable media of claim 13, wherein the plurality of acts further comprise:
receiving a SMS notification message from the user device indicating successful UICC update install on the UICC of the user device, the UICC update being installed on the UICC via chunking of the UICC install update file into multiple UICC update data chunks that are equivalent to or less than in size to a maximum Short Message Service (SMS) message size for assembly by the UICC into the UICC update; and
updating, under a direction of the UICC update service, the UICC update queue of the wireless communication network to show that the UICC update is installed on the UICC of the user device.

18. The one or more non-transitory computer-readable media of claim 13, wherein the plurality of acts further comprise:
receiving a SMS notification message from the user device indicating the UICC update failed to install on the UICC, the SMS notification message being sent by the trusted update application on the user device after a predetermined number of UICC update installation attempts have failed; and
generating a notification for an administrator of the wireless communication network to take corrective action in response to the SMS notification message.

19. The one or more non-transitory computer-readable media of claim 13, wherein updating the UICC of the user device via the UICC update file is a substitute for updating the UICC of the user device via multiple SMS messages that are sent from a server to the user device.

20. A user device, comprising:
one or more processors; and
memory including a plurality of computer-executable components that are executable by the one or more processors to perform a plurality of actions, the plurality of actions comprising:
receiving, a SMS information message form a wireless communication network indicating that a Universal Integrated Circuit Card (UICC) update is available for a UICC of the user device;
establishing a secure communication session between the user device and a UICC update service of the wireless communication network;
sending, based on a prompt from a trusted update application that is executing in a Trusted Execution Environment (TEE) of the user device, a registration message to the UICC update service that includes a trust credential of the TEE on the user device via the secure communication session in response to the SMS information message;
receiving a reply message from the UICC update service via the secure communication session indicating that the user device is validated for receiving the UICC update following a validation of the trust credential as being associated with the user device by a trusted authentication authority;
sending a UICC update request from the trusted update application to a UICC update service of the wireless communication network via the secure communication session;
storing a UICC update file that is received from the UICC update service of the wireless communication network via the secure communication session in the TEE of the user device;
transferring a copy of the UICC update file from the TEE of the user device to modem software associated with a modem of the user device;
chunking the UICC update files into multiple UICC update data chunks via the modem software, in which individual UICC update data chunks are equivalent to or less than in size to a maximum Short Message Service (SMS) message size; and
sending the multiple UICC update data chunks to the UICC of the user device via a communication channel between the user device and the UICC to update the UICC,
wherein updating the UICC of the user device via the UICC update file is a substitute for updating the UICC of the user device via multiple SMS messages that are sent from the wireless communication network to the user device.

* * * * *